US00RE49937E

(19) United States
(12) Reissued Patent
Cho et al.

(10) Patent Number: US RE49,937 E
(45) Date of Reissued Patent: Apr. 23, 2024

(54) ROTARY COMPRESSOR WITH VANE COUPLED TO ROLLING PISTON

(71) Applicant: LG ELECTRONICS INC., Seoul (KR)

(72) Inventors: Gukhyun Cho, Seoul (KR); Yunhi Lee, Seoul (KR); Byeongchul Lee, Seoul (KR)

(73) Assignee: LG ELECTRONICS INC., Seoul (KR)

(21) Appl. No.: 17/000,673

(22) Filed: Aug. 24, 2020

Related U.S. Patent Documents

Reissue of:
(64) Patent No.: 10,550,696
Issued: Feb. 4, 2020
Appl. No.: 15/506,300
PCT Filed: Aug. 19, 2015
PCT No.: PCT/KR2015/008655
§ 371 (c)(1),
(2) Date: Feb. 24, 2017
PCT Pub. No.: WO2016/043439
PCT Pub. Date: Mar. 24, 2016

(30) Foreign Application Priority Data

Sep. 19, 2014 (KR) ..... 10-2014-0125137

(51) Int. Cl.
*F01C 21/08* (2006.01)
*F03C 2/00* (2006.01)
(Continued)

(52) U.S. Cl.
CPC ..... *F01C 21/0809* (2013.01); *F04C 18/324* (2013.01); *F04C 18/356* (2013.01); *F04C 23/008* (2013.01); *F04C 29/00* (2013.01)

(58) Field of Classification Search
None
See application file for complete search history.

(56) References Cited

U.S. PATENT DOCUMENTS 1,876,370 A * 9/1932 Weber ..... F01C 21/0809 418/235
5,383,774 A * 1/1995 Toyama ..... F01C 21/0809 418/66

(Continued)

FOREIGN PATENT DOCUMENTS

CN 1087703 6/1994
CN 201448239 5/2010

(Continued)

OTHER PUBLICATIONS

U.S. Office Action dated Nov. 14, 2018 issued in U.S. Appl. No. 15/506,300 (p. 1506).

(Continued)

*Primary Examiner* — Glenn K Dawson
(74) *Attorney, Agent, or Firm* — KED & ASSOCIATES

(57) ABSTRACT

A compressor including a hinge recess formed at a rolling piston and a hinge protrusion formed at a vane to be inserted into the hinge recess. A diameter of the hinge protrusion is greater than an interval between both ends of an opening of the hinge recess. A bearing surface, which comes in contact with an inner circumferential surface of the hinge recess, of an outer circumferential surface of the hinge protrusion, has a circumferential surface below 90° at both sides, respectively, based on a central line in a lengthwise direction of the vane. This structure may facilitate cutting and grinding of the bearing surface so as to produce machining costs, and also improve a machining degree and thus stabilize behaviors of the rolling piston and the vane so as to enhance compression efficiency.

30 Claims, 9 Drawing Sheets

(51) Int. Cl.

| | |
|---|---|
| ***F03C 4/00*** | (2006.01) |
| ***F04C 2/00*** | (2006.01) |
| ***F04C 15/00*** | (2006.01) |
| ***F04C 18/324*** | (2006.01) |
| ***F04C 18/356*** | (2006.01) |
| ***F04C 23/00*** | (2006.01) |
| ***F04C 29/00*** | (2006.01) |

(56) References Cited

U.S. PATENT DOCUMENTS

| | | | | |
|---|---|---|---|---|
| 6,409,488 | B1 | 6/2002 | Ikoma et al. | |
| 8,602,755 | B2 * | 12/2013 | Park | F04C 23/008 418/210 |
| 9,017,048 | B2 * | 4/2015 | Byun | F04C 28/28 62/402 |
| 9,022,757 | B2 * | 5/2015 | Shin | F04C 29/0035 418/58 |
| 9,074,600 | B2 * | 7/2015 | Karino | F04C 18/04 |
| 11,300,122 | B2 * | 4/2022 | Moon | F04C 2/44 |
| 11,421,688 | B2 * | 8/2022 | Sa | F04C 18/344 |
| 11,655,817 | B2 * | 5/2023 | Na | F01C 21/0809 418/60 |
| 2005/0220655 | A1 * | 10/2005 | Cho | F01C 21/0809 418/139 |

FOREIGN PATENT DOCUMENTS

| | | | | |
|---|---|---|---|---|
| CN | 102317631 | | 1/2012 | |
| CN | 203412766 | | 1/2014 | |
| DE | 102007027528 | | 1/2008 | |
| JP | H 03-185291 | | 8/1991 | |
| JP | H 04-255591 | | 9/1992 | |
| JP | 6-58276 | | 3/1994 | |
| JP | 2010-168976 | | 8/2010 | |
| JP | 2010248911 | * | 11/2010 | F01C 21/0809 |
| JP | 2011-052592 | | 3/2011 | |
| KR | 10-2010-000369 | | 1/2010 | |
| KR | 10-2010-0000369 | * | 1/2010 | F04C 29/0028 |
| KR | 10-2010-0081810 | * | 7/2010 | F04C 18/356 |
| KR | 10-1409874 | | 6/2014 | |
| WO | WO 2010/116733 | | 10/2010 | |

OTHER PUBLICATIONS

European Search Report dated Feb. 12, 2018.

Chinese Office Action dated Mar. 5, 2018 (English Translation).

International Search Report dated Nov. 26, 2015 issued in Application No. PCT/KR2015/008655.

* cited by examiner

ROTARY COMPRESSOR WITH VANE COUPLED TO ROLLING PISTON

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED [APPLICATION] *APPLICATIONS*

This application is a *Reissue Application of U.S. Pat. No. 10,550,696 issued Feb. 4, 2020* (*U.S. patent application Ser. No. 15/506,300 filed Feb. 24, 2017*), *which is a* U.S. National Stage application under 35 U.S.C. § 371 of PCT Application No. PCT/KR2015/008655, filed Aug. 19, 2015, which claims priority to Korean Patent Application No. 10-2014-0125137, filed Sep. 19, 2014, whose entire disclosures are hereby incorporated by reference.

TECHNICAL FIELD

The present disclosure relates to a compressor, and more particularly, a compressor having a vane rotatably coupled to a rolling piston.

BACKGROUND ART

In general, compressors may be classified into a rotating type and a reciprocating type according to a method of compressing a refrigerant. The rotating type compressor varies a volume of a compression chamber while a piston performs a rotary or orbiting motion in a cylinder. The reciprocating type compressor varies a volume of a compression space while a piston performs a reciprocal motion in a cylinder. A rotary compressor which compresses a refrigerant while a piston rotates using rotational force of a driving motor is well known as one of the rotating type compressor.

The rotary compressor compresses a refrigerant by using a rolling piston which performs an eccentric rotary motion in a compressor space of a cylinder, and a vane which comes in contact with an outer circumferential surface of the rolling piston so as to divide the compression space of the cylinder into a suction chamber and a compression chamber. In recent time, a capacity-variable rotary compressor of which a refrigerating capacity is variable according to changes in loads is introduced. A technology of applying an inverter motor and a technology of varying a volume of a compression chamber by bypassing some of compressed refrigerant out of a cylinder are known as technologies for varying a refrigerating capacity of a compressor. However, for applying the inverter motor, a production cost of a compressor increases because a price of a driver for driving the inverter motor is extremely higher than that of a typical constant speed motor. On the other hand, for applying a refrigerant bypassing method, a piping system is made complicated, which increases flow resistance of the refrigerant and lowers efficiency of a compressor.

Also, in the rotary compressor, since a compression space is formed by the rolling piston and the vane, a degree that the rolling piston and the vane are closely adhered to each other is closely related to compressor efficiency. That is, when the rolling piston and the vane are spaced from each other, a refrigerant of a compression chamber may be leaked into a suction chamber to cause a compression loss, the vane may be jumped with respect to the rolling piston, thereby increasing compressor noise. On the other hand, when the rolling piston and the vane are excessively adhered to each other, a frictional loss may occur between the rolling piston and the vane. Taking into such problems account, a method has been known in the related art, as illustrated in FIG. 1, in which a hinge recess 3a is formed on an outer circumferential surface of a rolling piston 3, which is coupled to an eccentric portion 2a of a rotation shaft 2 in a compression space 1a of a cylinder 1 so as to perform an eccentric rotary motion, and a hinge protrusion 4a is formed on an end portion of a vane 4 which is slidably coupled to a vane slot 1b of the cylinder 1, such that the hinge protrusion 4a of the vane 4 is coupled to the hinge recess 3a of the rolling piston 3 to be rotatable within a predetermined angle. The related technology is disclosed in Japanese Patent Registration No. 2815432 (Name of the Invention: Rotary compressor).

However, in the related art rotary compressor, as a bearing surface of the hinge protrusion 4a is formed with an angle of circumference (or a circumferential angle) of 180° or more, an object to be processed (i.e., the hinge protrusion) is difficult to be in position while cutting and grinding the bearing surface of the hinge protrusion 4a, and accordingly should be machined in a special manner. This results in causing a difficulty in producing the hinge protrusion 4a of the vane 4 and increasing a machining cost.

In addition, in the related art rotary compressor, most of an outer circumferential surface of the hinge protrusion 4a is formed in a curved surface which mostly requires for high precision, which lowers a machining degree. Accordingly, interference is caused between the rolling piston 3 and the vane 4, which brings about an unstable behavior of the rolling piston 3 or the vane 4, resulting in lowering compression efficiency.

DISCLOSURE OF THE INVENTION

Therefore, an aspect of the detailed description is to provide a compressor, capable of easily machining a hinge protrusion of a vane which is inserted into a hinge recess of a rolling piston to be rotatable within a predetermined angle.

Another aspect of the detailed description is to provide a compressor, capable of enhancing compression efficiency by facilitating for precise machining of a hinge protrusion of a vane which is rotatably inserted into a hinge recess of a rolling piston.

To achieve these and other advantages and in accordance with the purpose of the present invention, as embodied and broadly described herein, there is provided a compressor including a driving motor, a rotation shaft configured to transfer a rotation force of the driving motor, and having an eccentric portion, a cylinder provided at one side of the driving motor, a rolling piston coupled to the eccentric portion of the rotation shaft, and having a hinge recess at an outer circumferential surface thereof, and a vane movably coupled to the cylinder, and having a hinge protrusion inserted into the hinge recess of the rolling piston to be rotatable by a predetermined angle, wherein a diameter of the hinge protrusion is greater than an interval between both ends of an opening of the hinge recess, wherein at least one bearing surface contacting an inner circumferential surface of the hinge recess is provided on an outer circumferential surface of the hinge protrusion, and wherein the bearing surface is formed within the range of ±90° based on a central line in a lengthwise direction of the vane body.

Here, at least one spaced surface spaced from the inner circumferential surface of the hinge recess may be formed at one side of the bearing surface.

The spaced surface may be formed as a single flat surface or a plurality of continuous flat surfaces.

A groove concaved in a central direction of the vane may be formed at a portion where the hinge protrusion starts. The groove may be connected to the spaced surface.

A point where the bearing surface and the spaced surface meet each other may be located on a line orthogonal to the central line in the lengthwise direction of the vane at the rotation center of the hinge protrusion.

The bearing surface may be provided by at least two with an interval along the outer circumferential surface of the hinge protrusion, and at least one space surface spaced from the inner circumferential surface of the hinge recess may be formed between the bearing surfaces.

The bearing surface may be formed at each of both sides based on the central line in the lengthwise direction of the vane.

To achieve the aspects or other features of the present invention, a compressor may include a driving motor, a rotation shaft configured to transfer a rotation force of the driving motor, and having an eccentric portion, a cylinder provided at one side of the driving motor, a rolling piston coupled to the eccentric portion of the rotation shaft, and having a hinge recess at an outer circumferential surface thereof, and a vane movably coupled to the cylinder, and having a hinge protrusion inserted into the hinge recess of the rolling piston to be rotatable by a predetermined angle. Here, an outer circumferential surface of the hinge protrusion may include a first surface forming the bearing surface together with the inner circumferential surface of the hinge recess, and second surfaces extending from both ends of the first surface and spaced apart from the hinge recess. A circumferential angle between both ends of the first surface meeting one end of each of the second surfaces may be 180° or less.

Here, if a width of the vane is t, a vertical distance from the central line (CL) in the lengthwise direction of the vane to a third point (P3) as another end of the second surface is $\alpha$, a radius of curvature of a curved surface connecting the inner circumferential surface of the hinge recess and an outer circumferential surface of the rolling piston as R1, a vertical distance from the central line (CL) in the lengthwise direction of the vane to a center O' of the curved surface is $\beta$, and a radius of curvature of the first surface is R, for $R \geq t/2$, the vertical distance from the central line (CL) in the lengthwise direction of the vane to the third point (P3) may satisfy the relation of $t/4 < \alpha < \beta - R1$.

The second surface may be formed by a plurality of flat surfaces. Here, on the basis of a first virtual line L1 connecting the rotation center P of the hinge protrusion to the first point P1 wherein the first surface and the second surface meet, a tilt angle $\theta 3$ of the flat surface connected to the first surface, of the plurality of flat surfaces forming the second surface, may be greater than an angle $\theta 4$ between the first virtual line L1 and a second virtual line connecting the first point P1 to the third point P3.

If a width of the vane is t, a vertical distance from the central line (CL) in the lengthwise direction of the vane to a third point (P3) as another end of the second surface is $\alpha$, a radius of curvature of a curved surface connecting the inner circumferential surface of the hinge recess and an outer circumferential surface of the rolling piston is R1, a vertical distance from the central line (CL) in the lengthwise direction of the vane to a center O' of the curved surface is $\beta$, and a radius of curvature of the first surface is R, for $R < t/2$, the vertical distance from the central line (CL) in the lengthwise direction of the vane to the third point (P3) may satisfy the relation of $t/4 \leq \alpha < \beta - R1$.

Another end of the second surface may meet a tilt surface formed as a flat surface at an end portion of the vane, and an angle between the second surface and the tilt surface may be equal to or greater than 90°.

The first surface may be provided in plurality, and at least one third surface, which is spaced apart from the inner circumferential surface of the hinge recess, may further be formed between the first surfaces. A circumferential angle of the third surface based on the central line in the lengthwise direction of the vane may be smaller than 90°.

To achieve these and other advantages and in accordance with the purpose of the present invention, as embodied and broadly described herein, there is provided a compressor including a driving motor; a rotation shaft configured to transfer a rotation force of the driving motor, the rotation shaft having an eccentric portion; a cylinder provided at one side of the driving motor, a rolling piston coupled to the eccentric portion of the rotation shaft, and having a hinge recess at an outer circumferential surface thereof; and a vane including a vane body slidably inserted into the cylinder, and a hinge protrusion extending from one end of the vane body and inserted into the hinge recess of the rolling piston to be rotatable by a predetermined angle, wherein a flat surface is formed on an outer circumferential surface of the hinge protrusion.

Here, wherein a virtual line, which passes across a rotation center of the hinge protrusion, forms a right angle with respect to a central line in the lengthwise direction of the vane body, and wherein the flat surface is formed at the vane body side based on the virtual line.

Advantageous Effect

In accordance with the detailed description, a compressor is configured such that a bearing surface of a hinge protrusion is formed only at a front side in a widthwise direction of the vane. This may facilitate for a cutting process and a grinding process with respect to the bearing surface, so as to reduce a machining cost. Also, a machining degree for the bearing surface can be improved and thus the behaviors of the rolling piston and the vane can be stabilized, thereby enhancing compression efficiency.

MODES FOR CARRYING OUT THE PREFERRED EMBODIMENTS

Hereinafter, a compressor according to the present invention will be described in detail based on one embodiment illustrated in the accompanying drawings.

Figure 1:
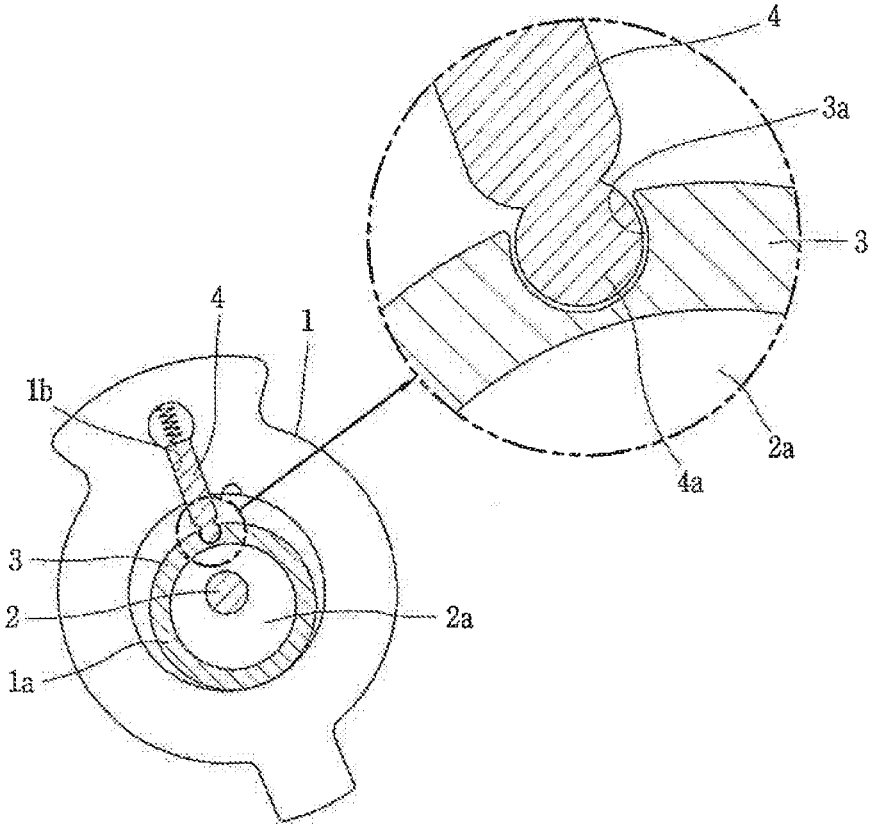
FIG. 1 RELATED ART
FIG. 1 is a planar view illustrating a coupling relation between a rolling piston and a vane of the related art rotary compressor.
Figure 2:
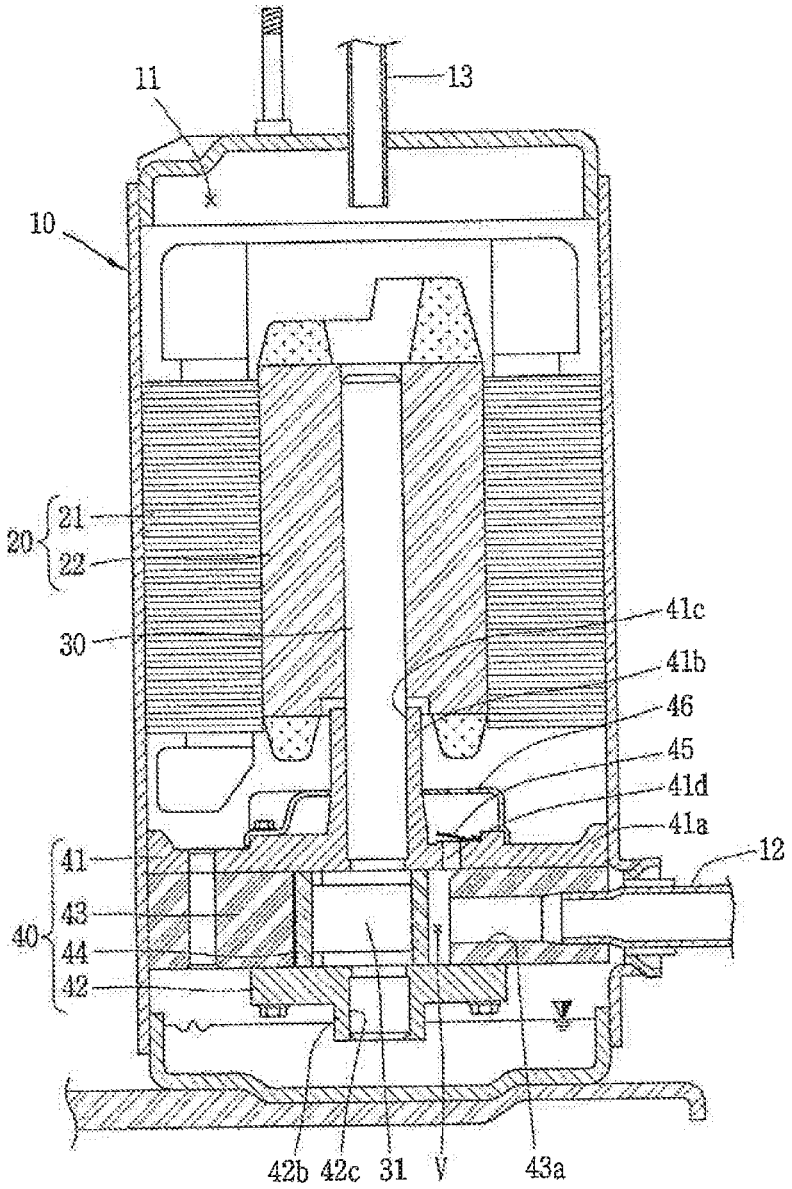
FIG. 2 is a longitudinal view of a rotary compressor in accordance with the present invention.
Figure 3:
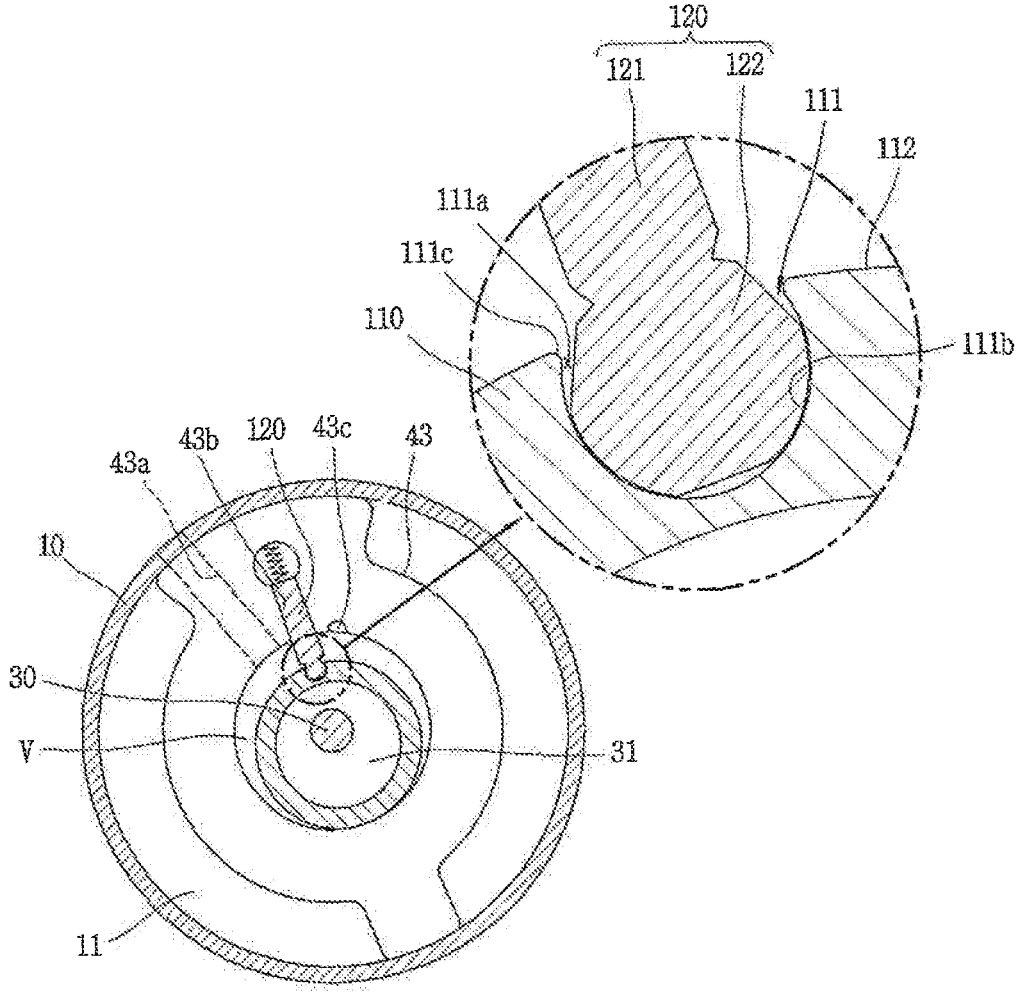
FIG. 3 is a planar view of a compression part according to FIG. 2.
Figure 4:
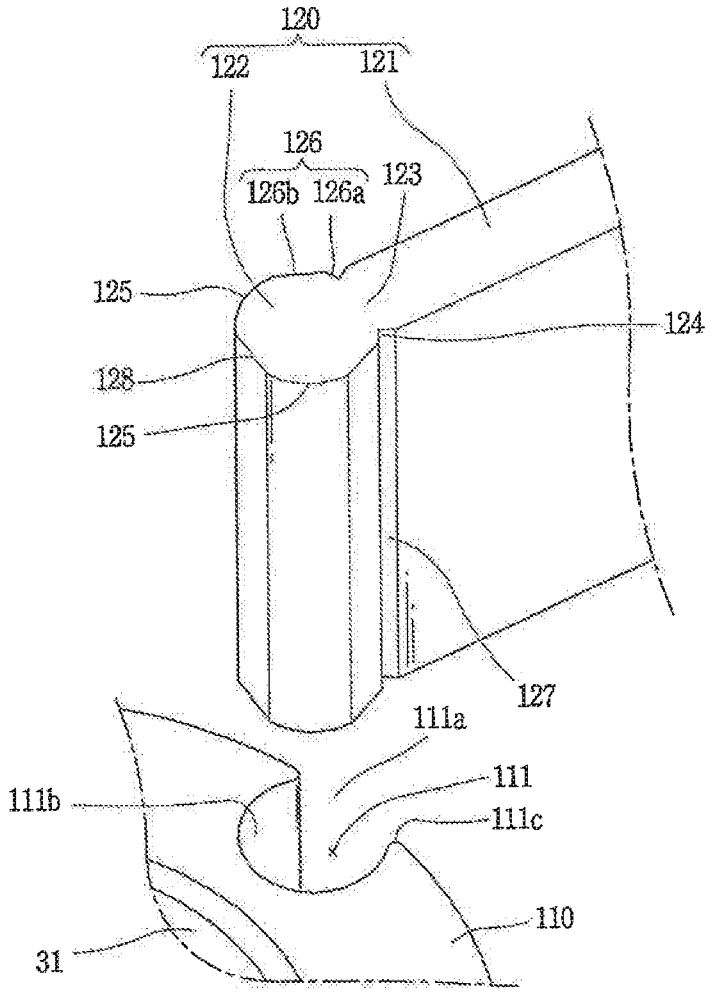
FIG. 4 is a perspective view illustrating a vane separated from a rolling piston in the compression part according to FIG. 3.

FIG. 2 is a longitudinal view of a rotary compressor in accordance with the present invention, FIG. 3 is a planar view of a compression part according to FIG. 2, and FIG. 4 is a perspective view illustrating a vane separated from a rolling piston in the compression part according to FIG. 3. As illustrated in FIGS. 2 to 4, a rotary compressor according to this embodiment may include a motor part 20 installed in a casing 10, and a compression part 40 mechanically connected to a lower side of the motor part 20 by a rotation shaft 30.

The motor part 20 may include a stator 21 press-fit into an inner circumferential surface of the casing 10, and a rotor 22 rotatably inserted into the stator 21. The rotation shaft 30 may be press-fit into the rotor 22.

The compression part 40 may include a main bearing 41 and a sub bearing 42 fixedly coupled to the casing 10 to support the rotation shaft 30, a cylinder 43 located between the main bearing 41 and the sub bearing 42 to form a compression space V, a rolling piston 110 coupled to an eccentric portion 31 of the rotation shaft 30 to compress a refrigerant while performing an eccentric rotary motion in the cylinder 43, and a vane 120 coupled to an outer circumferential surface of the rolling piston 110 to be rotatable within a predetermined angle and movably coupled to the cylinder 43 to divide the compression space V into a suction chamber and a compression chamber.

The main bearing 41 is formed in a disk-like shape, and provided with a side wall portion 41a along an edge thereof. The side wall portion 41a may be shrink-fitted or welded on an inner circumferential surface of the casing 10. A main shaft bearing portion 41b may protrude upwardly from a center of the main bearing 41. The main shaft bearing portion 41b may be provided with a shaft bearing hole 41c formed therethrough such that the rotation shaft 30 is inserted therein. A discharge port 41d may be formed at one side of the main shaft bearing portion 41b, and communicate with the compression space V such that a refrigerant compressed in the compression space V can be discharged into an inner space 11 of the casing 10. The discharge port 41d may also be formed at a sub bearing 42 other than the main bearing 41, in some cases.

The sub bearing 42 may be formed in a disk-like shape and coupled to the main bearing 41 together with the cylinder 43 by bolts. Of course, when the cylinder 43 is fixed to the casing 10, the sub bearing 42 may be coupled to the cylinder 43 together with the main bearing 41 by bolts. Or, when the sub bearing 42 is fixed to the casing 10, the cylinder 43 and the main bearing 41 may be coupled to the sub bearing 41 by bolts.

A sub shaft bearing portion 42b may protrude downwardly from a center of the sub bearing 42. The sub shaft bearing portion 42b may be provided with a shaft bearing hole 41c that is formed therethrough on the same shaft line as the shaft bearing hole 41c of the main bearing 41 so as to support a lower end of the rotation shaft 30.

As illustrated in FIG. 3, the cylinder 43 may be formed in an annular shape of which an inner circumferential surface is truly circular. An inner diameter of the cylinder 43 may be greater than an outer diameter of the rolling piston 110, and accordingly the compression space V may be formed between the inner circumferential surface of the cylinder and an outer circumferential surface of the rolling piston 110. That is, the inner circumferential surface of the cylinder 43 may form an outer wall surface of the compression space V and the outer circumferential surface of the rolling piston 110 may form an inner wall surface of the compression space V. Therefore, as the rolling piston 110 performs the eccentric rotary motion, the outer wall surface of the compression space V may form a fixed wall but the inner wall surface of the compression space V may form a variable wall that its position varies.

The cylinder 43 may be provided with a suction port 43a that is formed therethrough in a radial direction, and a suction pipe 12 may be connected to the suction port 43a through the casing 10. A vane slot 43b in which the vane 120 is slidably inserted may be formed in the cylinder 43 at one side of the suction port 43a in a circumferential direction of the suction port 43a. A discharge guide groove 43c for guiding a refrigerant toward the discharge port 41d of the main bearing 41 may be formed, in some cases, at one side of the vane slot 43b, namely, an opposite side to the suction port 43a. However, since the discharge guide groove generates a dead volume, it may not preferably be formed. Even though the discharge guide groove is formed, it may be configured to have the least volume, in order to reduce the dead volume generated due to the discharge guide groove and thus enhance compression efficiency.

The rolling piston 110 may be made of a lubricative material. The rolling piston 110 may be formed in an annular shape. The rolling piston 110 may also be formed to have an inner diameter great enough that its inner circumferential surface slidably comes in contact with an outer circumferential surface of the eccentric portion 31 of the rotation shaft 30. As illustrated in FIG. 3, the rolling piston 110 may be provided with a hinge recess 111 that is formed on an outer circumferential surface thereof such that a hinge protrusion 122 of the vane 120 which will be explained later is inserted to be rotatable within a predetermined angle.

Figure 5:
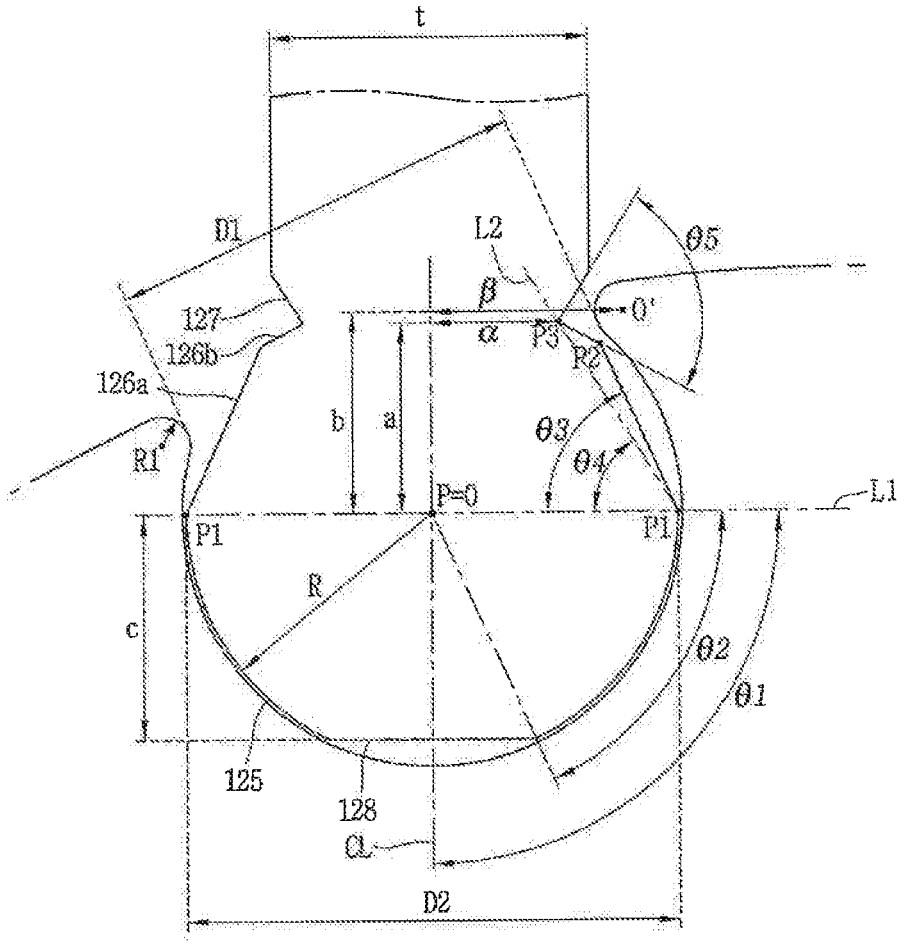
FIG. 5 is a planar view illustrating an enlarged hinge protrusion of the vane inserted into a hinge recess of the rolling piston according to FIG. 4.

FIG. 4 is a perspective view illustrating the vane separated from the rolling piston in the compression part according to FIG. 3, and FIG. 5 is an enlarged planar view of the hinge protrusion of the vane inserted into the hinge recess of the rolling piston according to FIG. 4. As illustrated in FIG. 4, the hinge recess 111 may be formed in a circular shape with a predetermined depth on the outer circumferential surface of the rolling piston 110 such that its inner circumferential surface can have an angle of circumference greater than about 180°. That is, a minimum interval D1 between both ends of an opening 111a of the hinge recess 111 may preferably by smaller than a maximum diameter D1 of the hinge protrusion 122 of the vane 120 to be explained later in the aspect that the hinge protrusion 122 is not separated from the hinge recess 111.

The both ends of the opening 111a of the hinge recess 111, namely, contact points between an inner circumferential surface 111b of the hinge recess 111 and an outer circumferential surface 112 of the rolling piston 110 may preferably be formed into curved surfaces 111c with a predetermined curvature or radius of curvature R1, or formed into a tilted shape in a cutting manner, like chamfering, so as to avoid interference by a tilt surface 127 of the vane 120 to be explained later. Here, the curved surface 111c of the hinge recess 111 may preferably be formed with the radius of curvature of about 0.3 mm or more in view of a cutting machining process.

Meanwhile, the vane 120 may generally be formed in a rectangular hexahedral shape. Here, one end of the vane, namely, an end portion of the vane at the side of the rolling piston may be provided with a hinge protrusion rotatably inserted into the hinge recess.

For example, the vane 120 may include a vane body 121 slidably inserted into the vane slot 43b, and a hinge protrusion 122 extending from one end of the vane body 121, namely, from an end surface of the vane body 121 facing the rolling piston (hereinafter, referred to as a front side) in a lengthwise direction of the vane body 121.

The vane body 121 may be formed in a hexahedral shape having an approximately the same thickness as a width of the vane slot 43b with a slight allowable error. This may allow both side surfaces of the vane body 121 to slidably come in contact with both side surfaces of the vane slot 43b, such that the vane 120 can keep moving straightly.

A thickness t of the vane body 121 may be smaller than a diameter D2 of the hinge protrusion 122, but in some cases, may be greater than the diameter D2 of the hinge protrusion 122. For the former, structural strength between the vane body 121 and the hinge protrusion 122 may be made relatively weak, but the tilt surface may become shallow so as to arise a reduction of a dead volume. For the latter, the structural strength between the vane body 121 and the hinge protrusion 122 may be reinforced but the length of the tilt surface 127 may extend and the dead volume may increase accordingly.

The hinge protrusion 122 may be inserted into the hinge recess 111 of the rolling piston 110 to be rotatable within a range of a predetermined angle in left and right directions upon being projected onto a plane. The outer circumferential surface of the hinge protrusion 122 may include a bearing surface 125 slidably contactable with the inner circumferential surface 111b of the hinge recess 111, and spaced surfaces 126 which extend both ends of the bearing surface 125, respectively, toward the vane body 121 and are spaced from the inner circumferential surface 111a of the hinge recess 111.

The bearing surface 125 may be formed such that its entire angle of circumference (or circumferential angle) can be about 180° or less. However, even though the entire circumferential angle of the bearing surface 125 is below 180°, when one end of the bearing surface 125 is formed over a central line in a widthwise direction of the hinge protrusion, a general cutting machining or grinding machining process, such as a milling machining process, may be unable to be performed. Therefore, the bearing surface may preferably be formed in such a manner that both bearing surfaces based on a central line CL (hereinafter, referred to as a vane central line) in the lengthwise direction of the vane can be within the range of ±90°.

Points (hereinafter, referred to as first points) P1 where the bearing surface 125 and the spaced surfaces 126 come in contact with each other may be formed at any positions within a range that the hinge protrusion 122 is not separated from the hinge recess 111, but may preferably be formed on a virtual line (hereinafter, referred to as a first virtual line) L1, which forms a right angle with respect to the vane central line CL and passes across a rotation center P of the hinge protrusion 122. This may allow a cutting machining process for the bearing surface to be executed at the front side.

The bearing surface 125 may be formed symmetrical in left and right directions based on the vane central line CL as the vane 120 rotates within the predetermined angle in the left and right directions based on the rotation center P of the hinge protrusion 122. For example, the first points P1 may be positions having the same circumferential angle (hereinafter, referred to as a first circumferential angle) θ1 on the basis of the vane central line CL, namely, within a range of about ±90° to left and right sides from the vane central line CL. If both ends of the bearing surface 125 extend over ±90° from the vane central line CL, setting a position of an object to be machined may be difficult during cutting and grinding machining and also a typical milling machining process may be disabled so as to make the cutting machining process complicated. However, in some cases, the bearing surface 125 may not be formed symmetrical to the vane central line CL. Even in this instance, the first circumferential angle of each bearing surface may preferably be formed within the range of ±90° or less.

Here, when a circumferential angle (hereinafter, referred to as a second circumferential angle) of the bearing surface based on the first virtual line L1 is θ2, it may be advantageous in the aspect of machinability of the bearing surface that the second circumferential angle is smaller than 90°, namely, set to approximately 60°. However, it may also be allowed that the second circumferential angle θ2 is very small, for example, smaller than 60°, if the rotation of the bearing surface 125 is not interrupted due to being caught by the inner circumferential surface 111b of the hinge recess 111 or a leakage of a refrigerant from a compression chamber to the bearing surface due to an extremely small area of the bearing surface is not caused.

The spaced surfaces 126 may be formed by straightly extending as flat surfaces (linear surfaces) from both ends of the bearing surface 125 toward the vane body 121.

The spaced surfaces 126 may include first spaced surfaces 126a extending from both ends of the bearing surface 125, namely, both of the first points P1, respectively, and second spaced surfaces 126b extending from the first spaced surfaces 126a to come in contact with tilt surfaces to be explained later, respectively.

Points (hereinafter, referred to as second points) P2 where the first and second spaced surfaces 126a and 126b meet each other may preferably be formed in a shape of protruding outwardly toward the vane slot 43b, so as to reduce a dead volume. That is, as illustrated in this embodiment, when the outer circumferential surface of the hinge protrusion 122 is formed with a circumferential surface and flat surfaces, portions of the spaced surfaces 126 corresponding to the flat surfaces may form a type of a cutoff surface so as to be spaced apart from the inner circumferential surface 111b of the hinge recess 111, which may bring about a generation of a dead volume. Therefore, in order to reduce the dead volume with forming the spaced surfaces 126 of the hinge protrusion 122 as the flat surfaces to be easily machined, as illustrated in FIG. 5, each spaced surface 126 may preferably have at least two flat surfaces and protrude in a direction of reducing the dead volume, namely, protrude toward the inner circumferential surface 111b of the hinge recess 111. To this end, a tilt angle θ3 of the first spaced surface 126a may be greater than an angle θ4 between the first virtual line L1 and a second virtual line L2 which connects the first point P1 to a point (hereinafter, referred to as a third point) P3 where the first spaced surface 126a meets the tilt surface 127.

The tilt surface 127 which is tilted with respect to an end portion of the vane 120 at the side of the milling piston 110 may extend from another end of the spaced surface 126, namely, an end of the second spaced surface 126b at the side of the vane body. A tilt angle θ5 of the tilt surface 127 with respect to the second spaced surface 126b may preferably be formed to be equal to or greater than 90° to reduce the dead volume. If the tilt angle θ5 of the tilt surface 127 is smaller than 90°, an interval between the tilt surface 127 and the second spaced surface 126b may become too narrow, and thus the tilt surface 127 may be interfered by both ends of the hinge recess 111 of the rolling piston 110. Therefore, the tilt angle θ5 of the tilt surface 127 may be formed to be greater than about 90°, such that the vane can smoothly rotate within a predetermined angle. Also, when the tilt angle θ5 of the tilt surface 127 is smaller than 90°, the tilt surface 127 or the second spaced surface 126b should be machined in a cutting manner by erecting it in a widthwise direction of the vane, which may make it more difficult to perform the machining.

Meanwhile, when the tilt angle θ5 of the tilt surface 127 is formed small while maintaining the interval between the tilt surface 127 and the second spaced surface 126b, a groove 124 which is formed by the tilt surface 127 and the second spaced surface 126b may be deep to that extent. This may lower structural strength at a neck portion 123 between the vane body 121 and the hinge protrusion 122. Therefore, a distance from the vane central line CL to the third point P3 may be smaller than a value, which is obtained by subtracting a radius of curvature R1 from a distance from the vane central line CL to a center O' of the curved surface at one of the both ends of the opening 111a of the hinge recess 111, and greater than a value, which is obtained by dividing a half of the thickness t of the vane by 2. That is, when a half of the vane width is greater than or equal to the radius of curvature of the hinge protrusion, if it is assumed that the vane width is t, a vertical distance from the vane central line CL to the third point P3 where the second spaced surface 126b and the tilt surface 127 meet is α, the radius of curvature of the curved surface 111c which connects the inner circumferential surface of the hinge recess and the other circumferential surface of the rolling piston 110 is R1, a vertical distance from the vane central line CL to the curved surface 111c is β, and the radius of curvature of the bearing surface of the hinge protrusion is R, the relation of $1/4<\alpha<\beta-R1$ may preferably be satisfied to ensure appropriate structural strength at the neck portion 123.

Also, when the tilt surface 127 is formed too far away from the hinge recess 111, the dead volume may increase between the groove 124 formed by the tilt surface 127 and the second spaced surface 126b and the opening 111a of the hinge recess 111. Therefore, when the vane 120 is rotated almost the most toward one side based on a center O of the opening 111a of the hinge recess 111, that is, when the vane 120 is rotated out of the center of the opening 111a of the hinge recess 111, a distance a from the rotation center P of the hinge protrusion 122 to the third point P3 based on the lengthwise direction of the vane 120 may preferably be smaller than a distance b from the rotation center P of the hinge protrusion 122 to the center O' of the curved surface, to reduce the dead volume.

Meanwhile, a circumferential length of the bearing surface 125 may preferably be as short as possible to reduce a precise machining area and a frictional loss, except for cases where the vane is separated during rotation with respect to the rolling piston, the behavior of the vane become unstable due to being interfered by the rolling piston, or a refrigerant leakage is caused due to a reduced sealing area.

Figure 8:
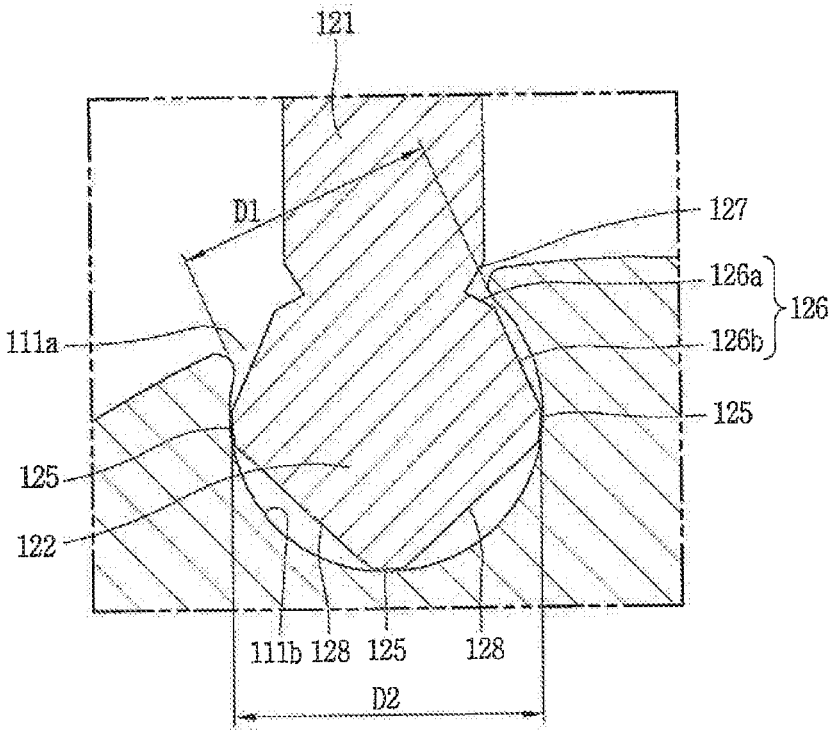
FIGS. 8 and 9 are planar views illustrating another embodiment of a hinge protrusion of a vane inserted into a hinge recess of a rolling piston in the rotary compressor according to FIG. 2.

A space surface 128 which is formed as a flat surface or a curved surface (here, a flat surface is illustrated in the drawing) may further be formed at a middle portion of the bearing surface 125. Accordingly, the bearing surface 125 may be formed at each of both sides with interposing the space surface 128 therebetween. Of course, the space surface 128 may be provided by more than one. For example, a plurality of space surfaces may be formed with the bearing surface 125 interposed between adjacent space surfaces, as illustrated in FIG. 8.

Figure 9:
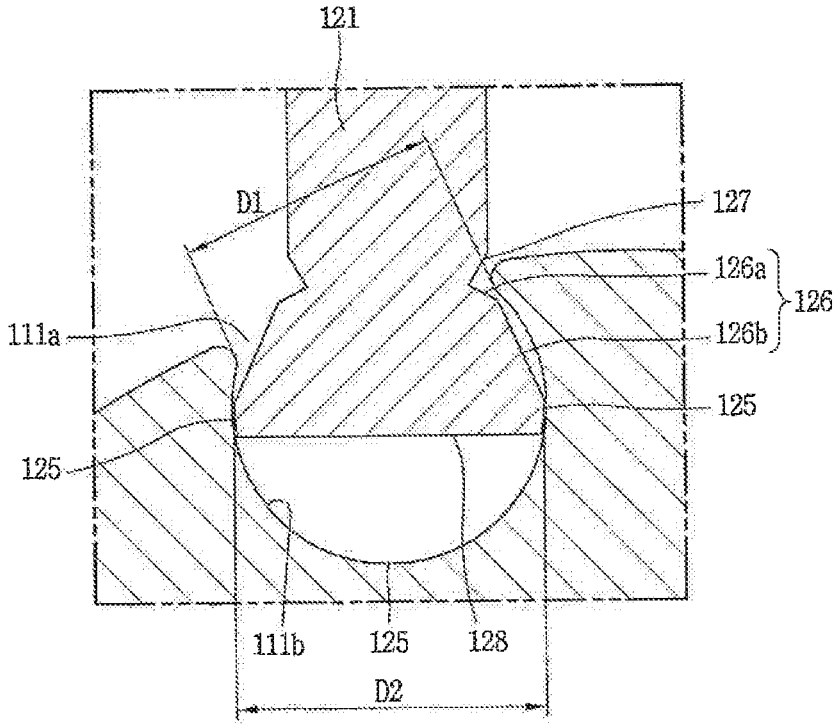

The space surface 128, as illustrated in FIG. 5, may preferably be formed in the range below 60° in left and right directions based on the vane central line CL, taking into account the separation of the vane 120, the vane 120 being stuck at the opening 111a of the hinge recess 111, or a refrigerant leakage between the vane 120 and the hinge recess 111, and the like. However, since oil is introduced and foreign materials which may be generated on the bearing surface 125 are discharged out through the space surface 128, the circumferential length of the space surface 128 may preferably be formed within the range of 90° or smaller. As illustrated in FIG. 9, the hinge protrusion 122 may be formed similar to a triangular shape upon being projected onto a plane (if it is assumed that the spaced surface is formed with one flat surface), or although not illustrated, may be formed into various shapes, such as a pentagonal shape, a hexagonal shape and the like according to a number of the space surface.

In order for a vertical distance from the rotation center P of the hinge protrusion 122 to the space surface 128 to be about 0.9 to 0.99 times of the curvature of the bearing surface 125, when it is assumed that the vertical distance from the rotation center P of the hinge protrusion 122 to the space surface 128 is c and a curvature of the bearing surface is R, the relation of $c<R\times(0.9-0.99)$ may preferably be satisfied in view of facilitating a cutting machining process, a smooth introduction of oil between the hinge protrusion and the hinge recess, and an easy discharge of foreign materials. However, in some cases, as mentioned in the description of FIG. 9, the vertical distance from the rotation center P of the hinge protrusion 122 to the space surface 128 may also be formed as short as possible, compared with the curvature R of the bearing surface 125, for example, within about 0.1 times of the curvature R, in the range that the hinge protrusion 122 is not separated from the hinge recess 111. In this instance, the machinability can be improved by virtue of a remarkably reduced area of the bearing surface 125 and the behavior of the rolling piston 110 or the vane 120 can be more stable by virtue of a reduced frictional area.

An unexplained reference numeral 13 denotes a discharge pipe, 35 denotes a discharge valve, and 36 denotes a muffler.

Hereinafter, description will be given of an operation of the rotary compressor according to the embodiment having the configuration.

That is, when the rotor 22 of the motor part 20 and the rotation shaft 30 rotate in response to power applied to the motor part 20, the rolling piston 110 sucks a refrigerant into the compression space V of the cylinder 43 while performing an eccentric rotary motion. The refrigerant is then compressed by the rolling piston 110 and the vane 120 and discharged into the inner space 11 of the casing 10 through the discharge port 41d provided at the main bearing 41. This series of processes are repeatedly performed.

Here, when the rolling piston 110 performs an eccentric rotary motion and the vane 120 performs a linear motion due to the vane 120 being detachably coupled the rolling piston 110, a refrigerant leakage may be caused between contact surfaces of the rolling piston 110 and the vane 120 due to the suction chamber and the compression chamber being open, which results from vane jumping, or a frictional loss may be caused between the contact surfaces of the rolling piston 110 and the vane 120 so as to bring about an abnormal behavior of the rolling piston 110 or the vane 120.

However, as illustrated in this embodiment, as the hinge protrusion 122 of the vane 120 is integrally inserted into the hinge recess 1111 of the rolling piston 110, jumping of the vane 120 which may occur during the eccentric rotary motion of the rolling piston 110 may be prevented, thereby blocking a refrigerant leakage from the compression chamber into the suction chamber.

Also, the vane 120 and the rolling piston 110 move together while the hinge protrusion 122 of the vane 120 is inserted in the hinge process 111 of the rolling piston 110. This structure does not need a separate pressing member at a rear end of the vane 120, which may result in a reduction of a fabricating cost and also a remarkable reduction of the frictional loss between the rolling piston 110 and the vane 120.

Meanwhile, the vane 120 according to this embodiment may cause a reduction of a machining cost by improving the machinability even during a process of machining the hinge protrusion 122, and enhancement of compression efficiency by allowing for a smooth behavior (movement or rotation) of the vane 120. For example, in order to form the hinge protrusion 122 in a shape similar to a circular section, namely, to form the bearing surface 125 by 180° or more, an object to be machined should be held in several directions during cutting and grinding machining processes, which may drastically lower the machinability and increase a machining area so as to increase a machining cost to that extent. However, as illustrated in this embodiment of the present invention, the outer circumferential surface of the hinge protrusion 122 may be configured in such a manner that the bearing surface 125 as the circumferential surface required to be precisely machined is formed only at the opposite side of the vane body 121 based on the first virtual line L1, and the spaced surfaces 126 as the flat surface without having to be precisely machined is formed at the side of the vane body, which may result in enhancing the machinability of the hinge protrusion 122 and lowering the machining cost.

FIGS. 6A to 6G are planar views illustrating sequential steps of a process of producing the vane in the compression part according to FIG. 3.

Figure 6A:
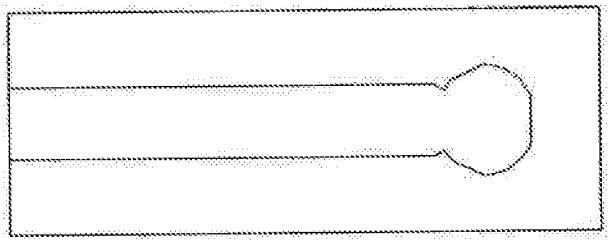
FIGS. 6A to 6G are planar views illustrating sequential steps of a process of producing the vane in the compression part according to FIG. 3.
Figure 6B:
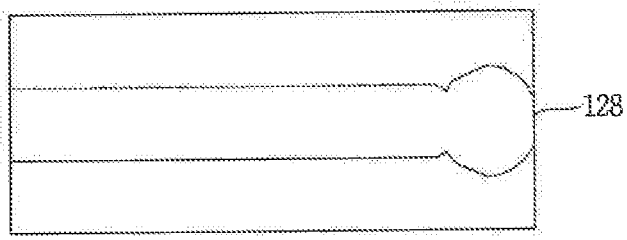

According to the order of machining the vane as illustrated in FIGS. 6A to 6G, an end surface of an object to be machined, as illustrated in FIGS. 6A to 6B, is cut along a thickness direction thereof to machine the space surface 128 into a flat surface, thereby appropriately reducing a machining length. Here, a circumferential angle or a circumferential length of the bearing surface 125 may properly be adjusted according to a location of the space surface 128.

Figure 6C:
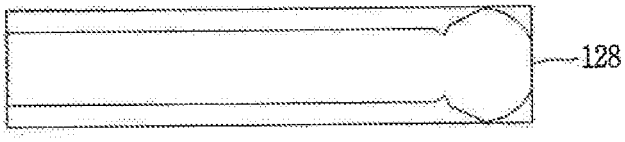

Afterwards, as illustrated in FIG. 6C, both side surfaces of the object are cut into a shape of a flat surface along a length direction, so as to facilitate a post-operation, such as cutting the bearing surface 125 or the spaced surfaces 126.

Figure 6D:
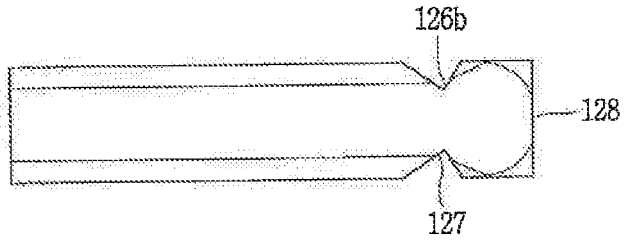

As illustrated in FIG. 6D, both side surfaces of the object are cut into a shape of a recess, like forming a notch surface, thereby forming the tilt surfaces 127 and the second spaced surfaces 126b as the flat surfaces. The tilt surfaces 127 and the second spaced surfaces 126b form wedge-like grooves 124, which act as types of shelter grooves for avoiding interference by both ends of the opening 111a of the hinge recess 111.

Figure 6E:
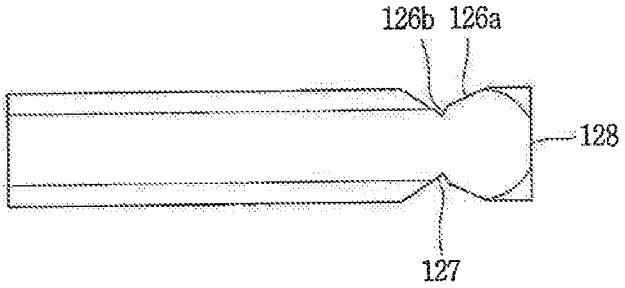

As illustrated in FIG. 6E, one side surface of the second spaced surface 126b is cut into a flat surface with a predetermined tilt angle, to form the first spaced surface 126a. Here, the circumferential angle or length of the bearing surface 125 may properly adjusted according to a tilt angle θ3 of the first spaced surface 126a.

Figure 6F:
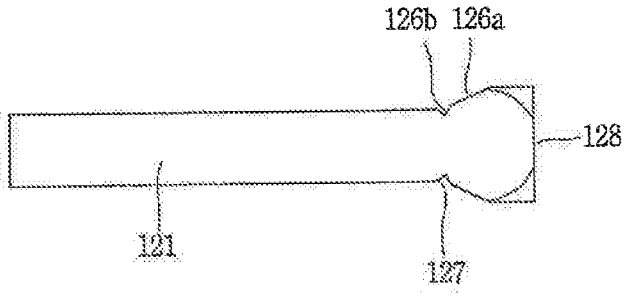
Figure 6G:
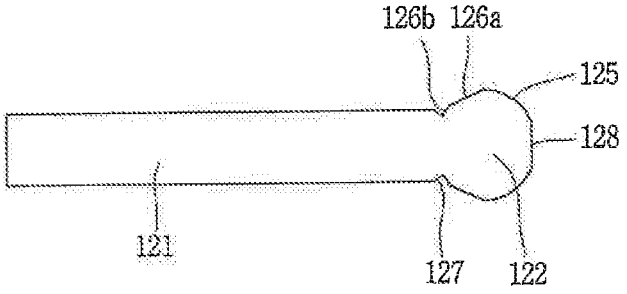

Afterwards, as illustrated in FIG. 6F, after both side surfaces of the vane 120 are cut and grinded into the flat surfaces as much as a vane thickness, as illustrated in FIG. 6G, the bearing surface 125 between the speed surface 126 and the spaced surface 128 of the hinge protrusion 122 is cut and grinded into a circumferential surface, thereby completely fabricating the vane 120.

In this manner, the bearing surface of the hinge protrusion may be formed only at the front side based on the widthwise direction of the vane. This may be facilitate the cutting and grinding machining processes for the bearing surface so as to reduce a machining cost, and also improvement of machinability so as to stabilize the behaviors of the rolling piston and the vane, thereby enhancing compression efficiency.

Hereinafter, another embodiment of a vane for a rotary compressor according to the present invention will be described.

That is, the foregoing embodiment illustrates that the diameter of the hinge protrusion is greater than the thickness of the vane. However, as illustrated in this another embodiment, the hinge protrusion may have a similar shape even when the diameter of the hinge protrusion is smaller than the thickness of the vane.

Figure 7:
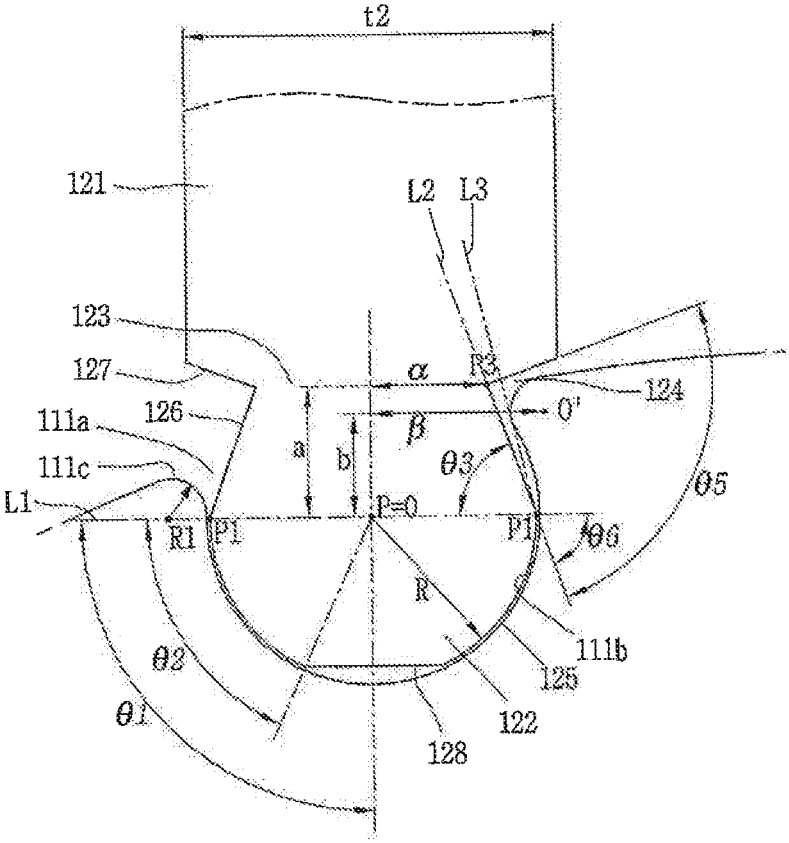
FIG. 7 is a planar view illustrating another embodiment of a hinge protrusion of a vane inserted into a hinge recess of a rolling piston in the rotary compressor according to FIG. 2.

For example, as illustrated in FIG. 7, the outer circumferential surface of the hinge protrusion 122 according to this another embodiment may include the bearing surface 125 formed on a part thereof as a circumferential surface, and spaced surfaces 126 each formed as a single flat surface from each of both ends of the bearing surface 125 to a third point P3 connected to the tilt surface 127 which is an end portion of the vane body 121 at the side of the rolling piston 110.

Here, if the circumferential angle (or angle of circumference) θ1 which is formed by the first virtual line L1, which connects the first points P1 where the bearing surface 125 meets the spaced surfaces 126 to the rotation center P of the hinge protrusion 122, and the vane central line CL, θ1 may be smaller than or equal to ±90°. In more detail, when the circumferential surface of the bearing surface based on the first virtual line is θ2, θ2 may be smaller than 90°. Accordingly, the cutting and grinding machining processes may be enabled only at the front side during machining of the bearing surface, and thus the machinability can be improved to that extent.

Also, when the half of the vane width is greater than the radius of curvature of the hinge protrusion, if the width of the vane is t, the vertical diameter from the vane central line CL to the third point P3 as another end of the spaced surface 126 is α, the radius of curvature of the curved surface 111c which connects the inner circumferential surface of the hinge recess and the outer circumferential surface of the rolling piston 110 is R1, the vertical distance from the vane central line CL to the center O' of the curved surface at each of both ends of the opening of the hinge recess is β, and the radius of curvature of the bearing surface of the hinge protrusion is R, the vertical distance from the vane central line CL to the third point P3 may satisfy the relation of $t/4 \leq \alpha < \beta - R1$. This may result in ensure structural strength of the neck portion between the vane body and the hinge protrusion.

In order for the spaced surface 126 to avoid the interference by the hinge recess, the spaced surface 126 may preferably be formed to get farther away from the inner circumferential surface of the hinge recess 111 as it is closer toward the vane body from the first point P1. Therefore, if an interior angle between the first virtual line L1 connecting the rotation center P of the hinge protrusion to the first point P1 and the spaced surface, namely, the tilt angle of the spaced surface is θ3, the tilt angle θ3 may preferably be smaller than an interior angle θ6 of a connection line L3 connecting the first point P1 to the curved surface 111c of each of the both ends of the opening 111a of the hinge recess 111, to avoid a contact between the spaced surface 126 and the inner circumferential surface 111b of the hinge recess 111.

And, a dead volume can be minimized by optimizing the length of the spaced surface 126. That is, when the length of the spaced surface 126 is too short, interference between the spaced surface 126 and the both ends of the opening 111a of the hinge recess 111 may be caused. On the other hand, when the length is too long, the dead volume may be generated. Therefore, if distances from the rotation center P of the hinge protrusion 122 to the third point P3 and the center O' of the curved surface along the lengthwise direction of the vane are a and b, respectively, and the radius of curvature of the curved surface is R1, the relation of $b<a<b+R1$ may preferably be satisfied to minimize the dead volume.

The tilt surface 127 which is recessed in the thickness direction of the vane may further be formed at the third point P3 as another end of the spaced surface, to avoid the interference between the vane 120 and the rolling piston 110. Here, a tilt angle θ5 of the tilt surface with respect to the spaced surface may preferably be greater than or equal to 90°, in view of performing the cutting machining process. If the tilt angle θ5 is smaller than 90°, the circumferential angle θ1 of the bearing surface 125 based on the vane central line CL exceeds ±90°. Accordingly, the curved surface should extend even up to the rear surface of the hinge protrusion 122, which may make the machining difficult.

The space surface 128 which is formed as a flat surface to reduce the area of the bearing surface 125 may further be formed at a middle portion of the bearing surface 125. Here, the space surface 128 may be formed as illustrated in the foregoing embodiment. However, when the space surface 128 is formed wider, it may be more advantageous in cutting machining process for other portions, an oil supply and a removal of foreign materials.

The basic configuration and operation effects of the hinge recess and the hinge protrusion according to this embodiment are the same as or similar to the foregoing embodiments, and thus will be understood based on the description of the foregoing embodiments

What is claimed is:

1. A compressor, comprising:

a drive motor;

a rotation shaft configured to transfer a rotation force of the drive motor, the rotation shaft having an eccentric portion;

a cylinder provided at one side of the drive motor, and having a vane slot;

a rolling piston coupled to the eccentric portion of the rotation shaft, and having a hinge recess at an outer circumferential surface of the rolling piston; and a vane having a vane body slidably inserted into the vane slot of the cylinder and a hinge protrusion inserted into the hinge recess of the rolling piston to be rotatable by a predetermined angle, wherein a diameter of the hinge protrusion is greater than an interval between both ends of an opening of the hinge recess, wherein *the* hinge protrusion includes:

at least one bearing surface contacting an inner circumferential surface of the hinge recess provided on an outer circumferential surface of the hinge protrusion, wherein the *at least one* bearing surface is formed within a range of ±90 degree based on a central line in a lengthwise direction of the vane; and a plurality of spaced surfaces spaced from the inner circumferential surface of the hinge recess formed on the outer circumferential surface of the hinge protrusion as flat surfaces, and wherein at least two of the plurality of spaced surfaces are respectively formed between ends of the at least one bearing surface and side surfaces of the vane body respectively corresponding to the ends of the at least one bearing surface such that the *at least two of the plurality of* spaced surfaces are formed at sides of the vane body based on a virtual line that passes across a rotation center of the hinge protrusion and forms a right angle with respect to the central line in the lengthwise direction of the vane body.

2. The compressor of claim 1, wherein the *at least two of the plurality of* spaced surfaces are respectively formed as a single flat surface or a plurality of continuous flat surfaces.

3. The compressor of claim 1, wherein a groove concaved in a central direction of the vane is formed at a portion where the hinge protrusion starts, and wherein the groove is connected to the *at least two of the plurality of* spaced surfaces.

4. The compressor of claim 1, wherein points at which the bearing surface and the *at least two of the plurality of* spaced surfaces meet each other are located on a line orthogonal to the central line in the lengthwise direction of the vane at a rotation center of the hinge protrusion.

5. The compressor of claim 1, wherein the at least one bearing surface comprises a plurality of bearing surfaces and at least one spaced surface spaced from the inner circumferential surface of the hinge recess is formed between the plurality of bearing surfaces.

6. The compressor of claim 5, wherein *one of* the plurality of bearing surfaces is formed [at each of both sides based on] *on one side of the hinge protrusion with respect to* the central line in the lengthwise direction of the vane *and another of the plurality of bearing surfaces is formed on the other side of the central line*.

7. The compressor of claim 1, wherein the outer circumferential surface of the hinge protrusion comprises:

[a] *at least one* first surface forming the at least one bearing surface; and second surfaces forming the at least two of the plurality of spaced surfaces[and], *the second surfaces* extending from [both] ends of the *at least one* first surface and spaced apart from the hinge recess, wherein a circumferential angle between [both] *the* ends of the *at least one* first surface meeting one end of each of the second surfaces is 180° or less.

8. The compressor of claim 7, wherein if a width of the vane is t, a [vertical] distance from the central line in the lengthwise direction of the vane to a point where a tilt surface and a second spaced surface of the second surfaces meet is α, a radius of curvature of a curved surface connecting the inner circumferential surface of the hinge recess and [an] *the* outer circumferential surface of the rolling piston is R1, a [vertical] distance from the central line in the lengthwise direction of the vane to a center of the curved surface is β, and a radius of curvature of the first surface is R, for R≥t/2, the [vertical] distance from the central line in the lengthwise direction of the vane to the point where the tilt surface and the second spaced surface of the second surfaces meet satisfies the relation of t/4<α<β-R1.

9. The compressor of claim 8, wherein the second surfaces are formed by a plurality of flat surfaces, and wherein on a basis of a first virtual line connecting the rotation center of the hinge protrusion to a point where the first surface and a first spaced surface of the second surfaces meet, a tilt angle formed between the first virtual line and the first spaced surface of the second surfaces, is greater than an angle between the first virtual line and a second virtual line connecting the point where the first surface and the first spaced surface of the second surfaces meet to the point where the tilt surface and the second spaced surface of the second surfaces meet.

10. The compressor of claim 7, wherein if a width of the vane is t, a [vertical] distance from the central line in the lengthwise direction of the vane to a point at which a tilt surface and a second spaced surface of the second surfaces meet is α, a radius of curvature of a curved surface connecting the inner circumferential surface of the hinge recess and [an] *the* outer circumferential surface of the rolling piston is R1, a [vertical] distance from the central line in the lengthwise direction of the vane to a center of the curved surface is β, and a radius of curvature of the first surface is R, for R<t/2, the [vertical] distance from the central line in the lengthwise direction of the vane to the point at which the tilt surface and the second spaced surface of the second surfaces meet satisfies the relation of t/4≤α<β-R1.

11. The compressor of claim 7, wherein another end of a second spaced surface of the second surfaces meets a tilt surface formed as a flat surface at an end portion of the vane, and wherein an angle between the second spaced surface of the second surfaces and the tilt surface is equal to or greater than 90°.

12. The compressor of claim 7, wherein the *at least one* first surface [is provided in] *comprises a* plurality *of first surfaces*, and at least one third surface is [further] formed between the *plurality of* first surfaces, the third surface being spaced apart from the inner circumferential surface of the hinge recess, and wherein a circumferential angle of the third surface based on the central line in the lengthwise direction of the vane is smaller than 90°.

13. A compressor, comprising:

a drive motor;

a rotation shaft configured to transfer a rotation force of the drive motor, the rotation shaft having an eccentric portion;

a cylinder provided at one side of the drive motor;

a rolling piston coupled to the eccentric portion of the rotation shaft, and having a hinge recess at an outer circumferential surface thereof; and a vane including a vane body slidably inserted into the cylinder, and a hinge protrusion rotatably inserted into the hinge recess of the rolling piston to be rotatable by a predetermined angle, wherein the hinge protrusion includes:

at least one bearing surface provided on an outer circumferential surface of the hinge protrusion, wherein the at least one bearing surface is formed as a curved surface so as to slidably contact [the] *an* inner circumferential surface of the hinge recess; and a plurality of flat surfaces formed on the outer circumferential surface of the hinge protrusion, wherein the plurality of flat surfaces is respectively formed between ends of the at least one bearing surface and side surfaces of the vane body respectively corresponding to the ends of the at least one bearing surface so as to be spaced from the inner circumferential surface of the hinge recess.

14. The compressor of claim 13, further comprising a tilt surface extending from one end of each flat surface and connected to one end of the vane body, respectively.

15. The compressor of claim 14, wherein the plurality of flat surfaces each includes a first flat surface extending from an end of the at least one bearing surface, respectively, and a second flat surface extending from the first flat surface to come in contact with one of the tilt surfaces.

16. The compressor of claim 14, wherein the plurality of flat surfaces each is formed as a single flat surface [and] *that* extends from [both ends] *one end* of the at least one bearing surface and contacts [both ends] *one* of the tilt surfaces[, respectively].

17. The compressor of claim 13, wherein at least one of the plurality of flat surfaces extends between ends of the at least one bearing surface.

*18. A compressor, comprising:*

*a rotary shaft;*

*first and second bearings that support the rotary shaft;*

*a cylinder disposed between the first and second bearings to define a compression space, and comprising a vane slot formed at an inner circumferential surface of the cylinder;*

*a rolling piston slidably coupled to the rotary shaft, and comprising a hinge recess formed at an outer circumferential surface of the rolling piston; and*

*a vane, a first end of which is slidably coupled to the vane slot of the cylinder, and a second end of which is rotatably coupled to the hinge recess of the rolling piston, wherein the vane comprises a hinge protrusion inserted into the hinge recess of the rolling piston, and a vane body connected to the hinge protrusion, and slidably inserted into the vane slot of the cylinder, wherein a diameter of the hinge protrusion is greater than an interval between ends of the hinge recess, wherein the hinge protrusion comprises at least one bearing surface that contacts an inner circumferential surface of the hinge recess and a plurality of spaced surfaces spaced from the inner circumferential surface of the hinge recess formed on an outer circumferential surface of the hinge protrusion as flat surfaces, wherein the at least one bearing surface is disposed only on a rolling piston side based on a virtual line that passes across a rotation center of the hinge protrusion and forms a right angle with respect to a central line in a lengthwise direction of the vane, and wherein at least two of the plurality of spaced surfaces are respectively formed between ends of the at least one bearing surface and side surfaces of the vane body respectively corresponding to the ends of the at least one bearing surface such that the plurality of spaced surfaces are formed at sides of the vane body based on the virtual line.*

*19. The compressor according to claim 18, wherein the plurality of spaced surfaces is each formed as a single flat surface or a plurality of continuous flat surfaces.*

*20. The compressor according to claim 18, wherein the vane comprises a groove concaved in a central direction of*

*the vane at a portion where the hinge protrusion starts, and wherein the groove connects the vane body and the plurality of spaced surfaces.*

*21. The compressor according to claim 18, wherein points at which the at least one bearing surface and the plurality of spaced surfaces meet each other are disposed on the virtual line.*

*22. The compressor according to claim 18, wherein the hinge protrusion comprises a first surface that forms the at least one bearing surface, and second surfaces that form the plurality of spaced surfaces and extend from ends of the first surface and spaced apart from the hinge recess, and wherein a circumferential angle between the ends of the first surface meeting one end of each of the second surfaces is 180° or less.*

*23. The compressor according to claim 22, wherein each second surface comprises a first spaced surface that extends from the first surface, and a second spaced surface that extends from the first spaced surface, wherein if a width of the vane is t, a distance from the central line in the lengthwise direction of the vane to a point where a tilt surface that connects the vane body and the second surface and a second spaced surface of the second surface meet is α, a radius of curvature of a curved surface that connects the inner circumferential surface of the hinge recess and the outer circumferential surface of the rolling piston is R1, a distance from the central line in the lengthwise direction of the vane to a center of the curved surface is β, and a radius of curvature of the first surface is R, for R≥t/2, the distance from the central line in the lengthwise direction of the vane to the point where the tilt surface and the second spaced surface of the second surface meet satisfies the relation of t/4<α<β-R1.*

*24. The compressor according to claim 23, wherein each second surface is formed by a plurality of flat surfaces, and wherein on a basis of a first line connecting the rotation center of the hinge protrusion to a point where the first surface and the first spaced surface of the second surface meet, a tilt angle formed between the first line and the first spaced surface of the second surface is greater than an angle between the first line and a second line connecting the point where the first surface and the first spaced surface of the second surface meet to the point where the tilt surface and the second spaced surface of the second surface meet.*

*25. The compressor according to claim 22, wherein each second surface comprises a first spaced surface that extends from the first surface, and a second spaced surface that extends from the first spaced surface, wherein if a width of the vane is t, a distance from the central line in the lengthwise direction of the vane to a point where a tilt surface connecting the vane body and the second surface and a second spaced surface of the second surface meet is α, a radius of curvature of a curved surface that connects the inner circumferential surface of the hinge recess and the outer circumferential surface of the rolling piston is R1, a distance from the central line in the lengthwise direction of the vane to a center of the curved surface is β, and a radius of curvature of the first surface is R, for R<t/2, the distance from the central line in the lengthwise direction of the vane to the point where the tilt surface and the second spaced surface of the second surface meet satisfies the relation of t/4≤α<β-R1.*

*26. The compressor according to claim 22, wherein each second surface meets a tilt surface formed as a flat surface at an end portion of the vane body, and wherein an angle between the second surface and the tilt surface is equal to or greater than 90°.*

*27. The compressor according to claim 22, wherein the first surface comprises a plurality of first surfaces spaced apart from each other, wherein the hinge protrusion comprises a third surface that connects the plurality of first surfaces, and spaced apart from the inner circumferential surface of the hinge recess, and wherein a circumferential angle of the third surface based on the central line in the lengthwise direction of the vane is smaller than 90°.*

*28. The compressor according to claim 18, wherein the at least one bearing surface comprises two bearing surfaces spaced apart from each other, and wherein the hinge protrusion comprises a spaced surface that connects the two bearing surfaces and that is spaced from the inner circumferential surface of the hinge recess.*

*29. The compressor according to claim 28, wherein one of the two bearing surfaces is formed on one side of the hinge protrusion with respect to the central line in the lengthwise direction of the vane and another of the two bearing surfaces is formed on the other side of the central line.*

*30. A compressor, comprising:*

*a rotary shaft;*

*first and second bearings that support the rotary shaft;*

*a cylinder disposed between the first and second bearings to define a compression space, and comprising a vane slot formed at an inner circumferential surface of the cylinder;*

*a rolling piston slidably coupled to the rotary shaft, and comprising a hinge recess formed at an outer circumferential surface of the rolling piston; and*

*a vane, a first end of which is slidably coupled to the vane slot of the cylinder, and a second end of which is rotatably coupled to the hinge recess of the rolling piston, wherein the vane comprises a hinge protrusion inserted into the hinge recess of the rolling piston, and a vane body connected to the hinge protrusion, and slidably inserted into the vane slot of the cylinder, wherein a diameter of the hinge protrusion is greater than an interval between ends of the hinge recess, wherein the hinge protrusion comprises at least one bearing surface that contacts an inner circumferential surface of the hinge recess and a plurality of spaced surfaces spaced from the inner circumferential surface of the hinge recess formed on an outer circumferential surface of the hinge protrusion as flat surfaces, wherein the at least one bearing surface is formed only within a range of ±90° based on a central line in a lengthwise direction of the vane, and wherein at least two of the plurality of spaced surfaces are respectively formed between ends of the at least one bearing surface and side surfaces of the vane body respectively corresponding to the ends of the at least one bearing surface such that the spaced surfaces are formed at sides of the vane body based on a virtual line that passes across a rotation center of the hinge protrusion and forms a right angle with respect to the central line in the lengthwise direction of the vane body.*

* * * * *